United States Patent [19]
Ewing

[11] 3,900,212
[45] Aug. 19, 1975

[54] TRAILER HITCH

[76] Inventor: Marlin B. Ewing, 259 S. Bayshore Dr., Valparaiso, Fla. 32580

[22] Filed: Sept. 16, 1974

[21] Appl. No.: 506,027

[52] U.S. Cl............. 280/406 A; 280/484; 280/489; 280/492
[51] Int. Cl............................................ B62d 53/00
[58] Field of Search................ 280/406 A, 484, 489

[56] References Cited
UNITED STATES PATENTS

| | | | |
|---|---|---|---|
| 3,284,098 | 11/1966 | Worley | 280/406 A |
| 3,403,928 | 10/1968 | Laughlin | 280/406 A |
| 3,434,735 | 3/1969 | Bernard | 280/406 A |
| 3,445,125 | 5/1969 | Stewart | 280/406 A |
| 3,490,789 | 1/1970 | Stewart | 280/406 A |
| 3,542,395 | 11/1970 | Millikan | 280/406 A |
| 3,601,427 | 8/1971 | Holt | 280/406 A |

Primary Examiner—Leo Friaglia
Attorney, Agent, or Firm—Patrick F. Henry

[57] ABSTRACT

A trailer hitch includes a rigid, vertical hitch pin supported at the rear of a lead towing vehicle and a coupling collar which fits around the hitch pin permitting rotary motion about a vertical axis. The collar is mounted on the trailer on a tilting bolt bracket by means of a horizontal pin extending transversely across the trailer permitting pivotal movement thereabout and the tilting bolt is pivotally connected in a longitudinal direction on the end of the trailer for pivotal motion in a horizontal direction along the horizontal center of the trailer. The coupling collar also carries one or more equalizer bar members which engage a portion of a retractable trailer jack after the trailer hitch has been mounted on the pin and the jack retracted from the ground to allow the weight of the hitch collar to rest on the lead vehicle pin.

11 Claims, 5 Drawing Figures

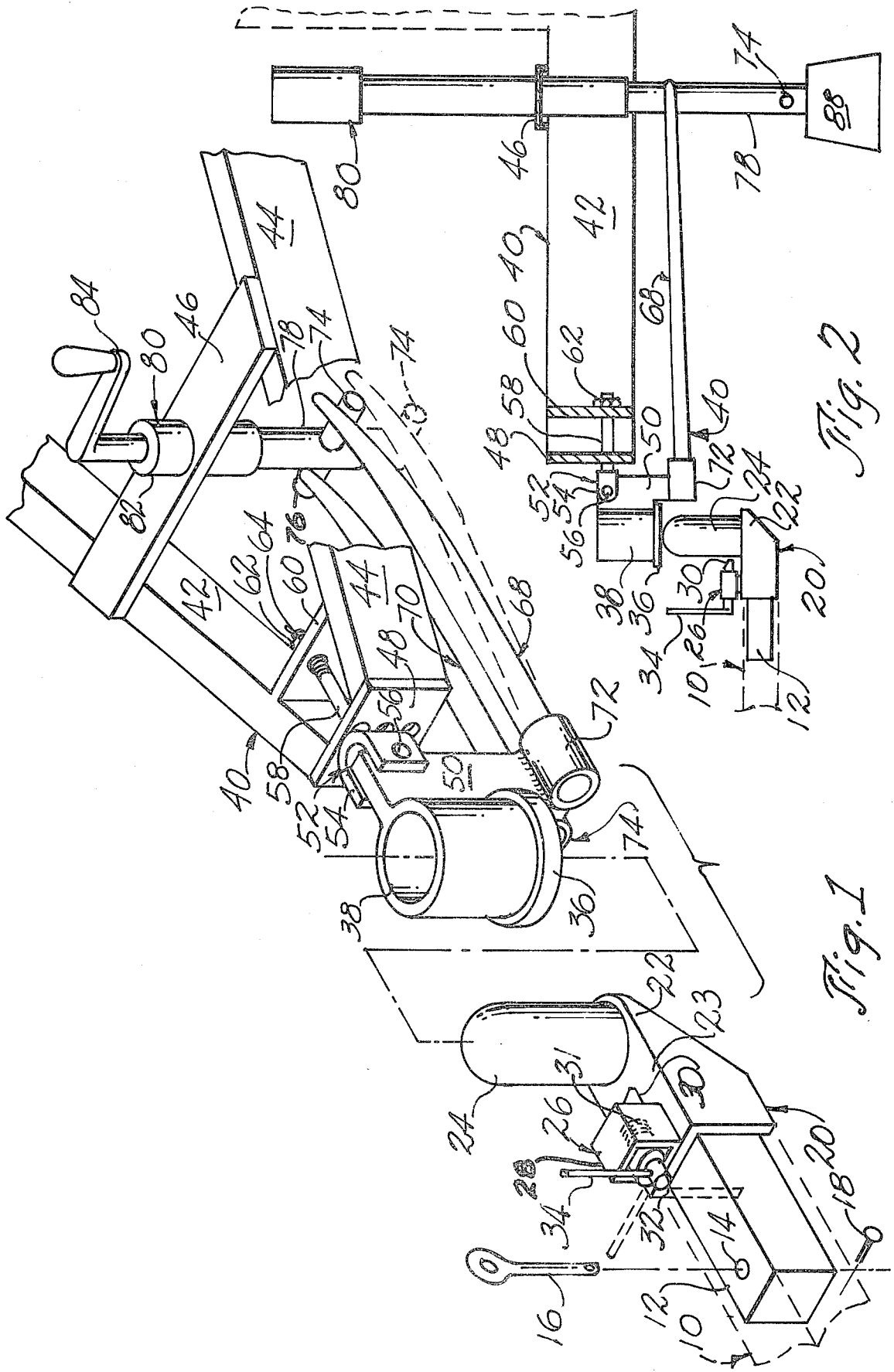

TRAILER HITCH

BACKGROUND OF THE INVENTION

1. Field of the Invention

Hitching and controlling devices for land vehicles and especially trailer hitches which permit movement between the lead and the towed vehicle.

2. Description of the Prior Art

The more common hitches on the market for attaching a car to a trailer vary with the weights involved but practically all use a ball and socket attachment usually with the ball rigidly mounted on a hitch bar attached to the vehicle bumper, body or frame or combination of all. This is quite satisfactory for lightweight trailers such as small campers and boat trailers where the hitch weight at the hitch is usually below 150 pounds and where the trailer itself is usually somewhat less than 1,000 pounds in total weight. However, when trailers of over 1,200 pounds weight are pulled the hitch weight usually becomes excessive because it is recommended that 10 to 15% of the gross weight be carried on the hitch for stable towing and therefore a 1,500 pound trailer would place between 150 pounds and 225 pounds on the hitch. Since this weight is applied several feet behind the rear axle, a strong force is exerted to tilt the back of the car downward. This tilting action alters front end alignment, headlight alignment and places heavy stresses and forces on the rear axle and wheel bearings of the towing vehicle. This is further aggravated by additional articles in the trunk and/or several heavy people in the back seat.

In order to deal with the tilting effect of pulling heavy trailers with hitch weights as great as 800 pounds, hitch manufacturers have modified the basic ball and socket design by the addition of equalizing arms, the purpose of which is to make a semi-rigid connection between car and trailer restricting vertical movement but not limiting turn and twisting at the hitch. In order to accomplish the desired effect with this sort of arrangement the hitch attachment at the car should be strong enough to transmit torque through the car frame longitudinally and therefore the attachment to the car must extend well forward for a solid purchase on the frame. The usual ball is attached to this reinforced car attachment but it now rests on top of a large and heavy structural member which has fittings for equalizer arm attachment. These arms must always be removed from the car after the trailer is detached. Most people find this attachment and detachment a laborious, dirty and aggravating job. Furthermore, the procedure for hitching requires considerable use of the vertical jack which is permanently installed behind the hitch socket and the job of jacking the trailer into position and so forth is quite undesirable and time consuming and is not without some element of danger to both the equipment and the operator. For example, a summary of the operations required are as follows:

1. raise trailer socket with jack;
2. back car to trailer placing ball under socket;
3. lower socket onto ball with jack and lock in place;
4. install equalizer arms into car hitch structural member;
5. raise hitch and rear of car with jack;
6. attach back ends of equalizer bars to respective sides of trailer A-frame using a long bar for leverage;
7. lower hitch and rear of car with jack stressing equalizer bars and continue to raise jack to clear for pulling.

The previous method therefore requires four separate operations of the jack together with attachment of equalizer arms to car hitch member and the levering of the equalizer arms into attachment to the trailer A-frame.

The present invention is a simple and easier and more dependable way of hooking up the lead and towed vehicle and while it requires an equally strong attachment to the towing vehicle and equalizer bar or bars of similar strength it differs in that instead of a ball and socket a vertical pin is used and only this pin is attached to the car, all other components of the hitch remaining permanently attached to the trailer A-frame.

SUMMARY OF THE INVENTION

An object of this invention is to provide an improved trailer hitch which utilizes an equalizer bar or bars that are stressed through the weight on the towing vehicle and the operation of the jack.

Still another object of this invention is to provide a trailer hitch which requires only a rigid upright pin fixed at the rear of the lead towing vehicle and the necessary articulation of the trailer is obtained by means of movement of the coupling member on the trailer which is articulated in at least two directions, whereby the towing vehicle does not have attached to it the usual heavy and cumbersome support structure for the equalizer bars.

An additional object of this invention is to provide a trailer hitch which is easier and quicker to couple and uncouple.

Other and further objects and advantages of my invention will become apparent upon reading the following description of the preferred embodiment taken in conjunction with the accompanying drawings.

BRIEF DESCRIPTION OF THE DRAWING

FIG. 1 is a perspective view of the hitch of the present invention next to the coupler pin of the towing vehicle.

FIGS. 2 thru 5, inclusive, are a series of diagrammatic drawings representing side elevation views of the device in FIG. 1 and illustrating the coupling of the trailer hitch shown in FIG. 1 to the coupler pin on the vehicle thereby representing a typical hook-up.

DESCRIPTION OF THE PREFERRED EMBODIMENT

Figure 3:
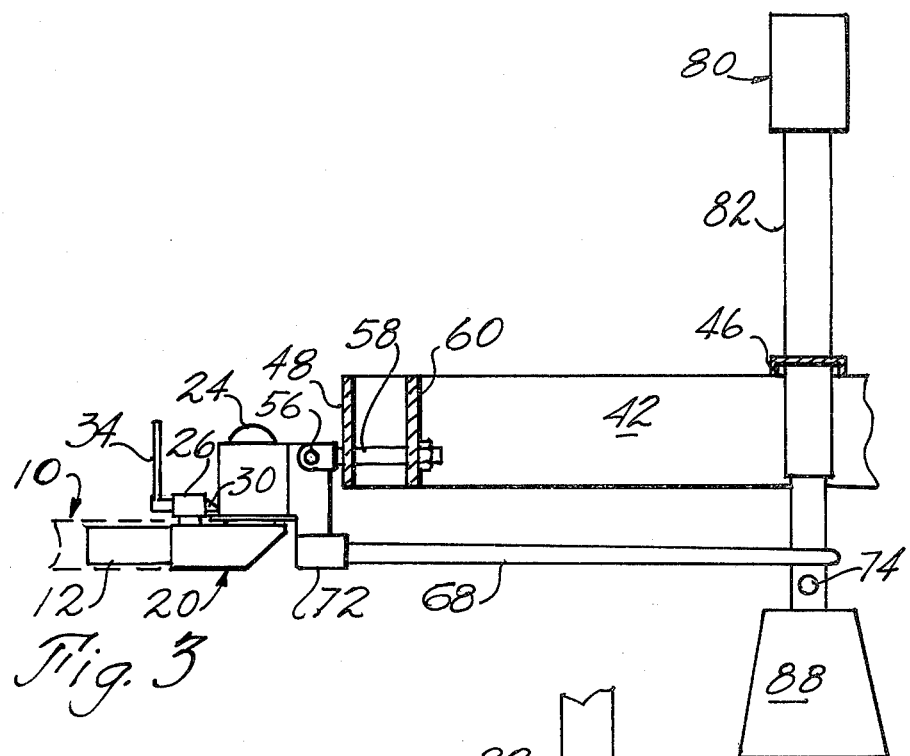

In the perspective view in FIG. 1 the lead vehicle (not shown) is a conventional automobile, station wagon, pick-up truck or other towing vehicle which, by attachment to frame, bumper, etc., employs a heavy tubular drawbar tube member 10 receiving in the tube 10 a smaller connection member 12 having a hold therein 14 matching with a thru opening in the drawbar tube 10 and in which is placed a vertical eyebolt 16 detachably held in place by a cotter key 18. Connection member 12 is part of the lead vehicle drawbar coupler designated generally by reference numeral 20.

The drawbar coupler 20 comprises a heavy metal U-shaped bracket 22 having a top support surface 23 and on which is mounted a cylindrical coupling pin 24 that is made of heavy-duty steel and is suitably welded in place. A retractable latch device designated generally by reference numeral 26 comprises a latch housing 28 in which is mounted a spring biased latching dog 30 operated against spring 31 by a shaft 32 having a pin 34 thereon for the purpose of latching into place the peripheral flange 36 on the collar 38 which is the coupler cylinder that fits over the pin 24.

The entire trailer hitch, which from the coupler collar 38 thereon, is designated generally by reference numeral extending and is attached to the usual trailer A-frame structure comprised of heavy steel intersecting chassis frame members 42, 44, on which is welded transversely a steel cross member 46, and connected at the ends by means of a heavy steel plate member 48 welded in place against the terminal ends of the members 42, 44. The coupler collar 38 has a longitudinal plate member 50 extending peripherally therefrom and being supported on a tilting bolt 52 comprising a bolt 58 and a bifurcated portion 54 in which plate 50 is mounted on a horizontal, transverse pin 56. The bolt 58 extends through an opening in plate 48 and through a similar opening in a second plate 60 welded between the ends of the frame members 42, 44 and is held in place by means of a nut 62 and a cotter key 64 permitting rotary movement of the bolt 58 about a longitudinal, horizontal axis in the direction of the trailer frame 40 thereby permitting the coupler collar 38 to pivot about such an axis as well as about the horizontal transverse axis of pin 56. A pair of elongated equalizer members 68, 70 made of heavy-duty spring steel, have one end fixed in a respective collar 72, 74 welded to the bottom of plate 50 and extend to engage at times, as will appear from the diagrams in FIGS. 2 thru 5, inclusive, a respective pair of projecting pins 74, 76 rigidly mounted on a jack shaft 78 of a standard and conventional jack which is designated generally by reference numeral 80.

The movable jack shaft 78 slides vertically without turning within collar 82 welded to frame member 46 and is rotatably attached to a screw threadedly mounted in the internally threaded collar 82. The upper end of the screw is attached to a hand crank 84 for the purpose of screwing the shaft 78 in one direction or the other to bring the bottom end of the shaft 78 at times into engagement with the ground or with a suitable removable block 88 resting on the ground, or to cause pins 74 and 76 to exert pressure against equalizer bars 68, 70. A standard and conventional electric jack (not shown) or hydraulic jack (not shown) may be used.

Referring to the diagrammatic views in FIGS. 2 thru 5, inclusive, and initially to FIG. 2, it is seen that the trailer hitch 40 has the collar 38 thereof above pin 24 and the bottom of the jack shaft 78 is resting on the block 88 which is the position of the trailer after the towing vehicle having the drawbar 20 thereon was previously uncoupled and disengaged. The lead, towing vehicle has been backed into position to place the pin 24 in alignment with and beneath the open socket in collar 38 which is accomplished through the use of the crank 84 on jack 80 if necessary to bring the end of the trailer hitch higher, and in this position the stabilizer arms 68, 70 are far above the pins 74, 76 hanging loosely, completely unstressed and out of engagement.

Figure 4:
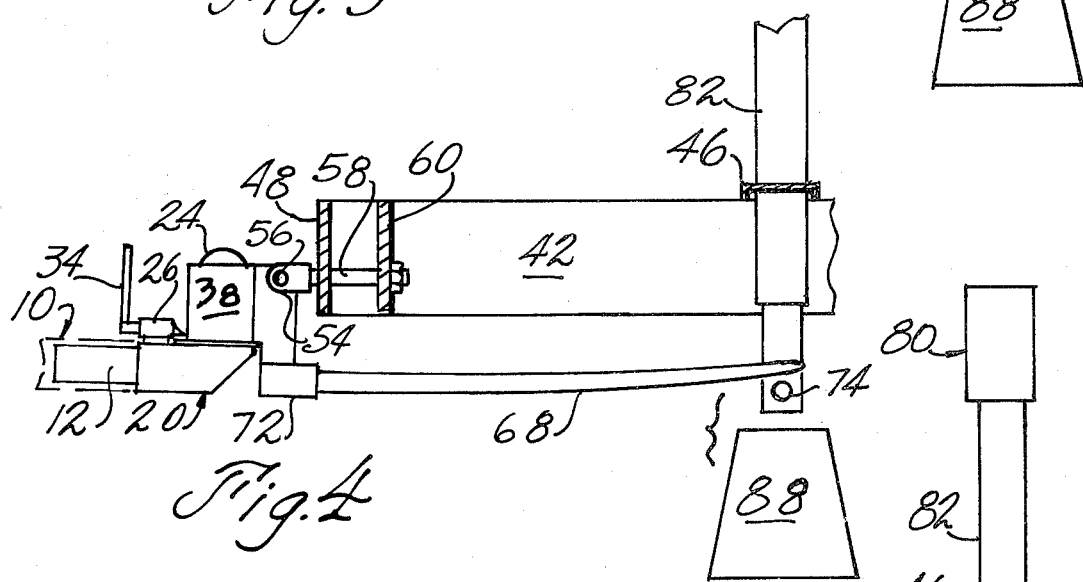
Figure 5:
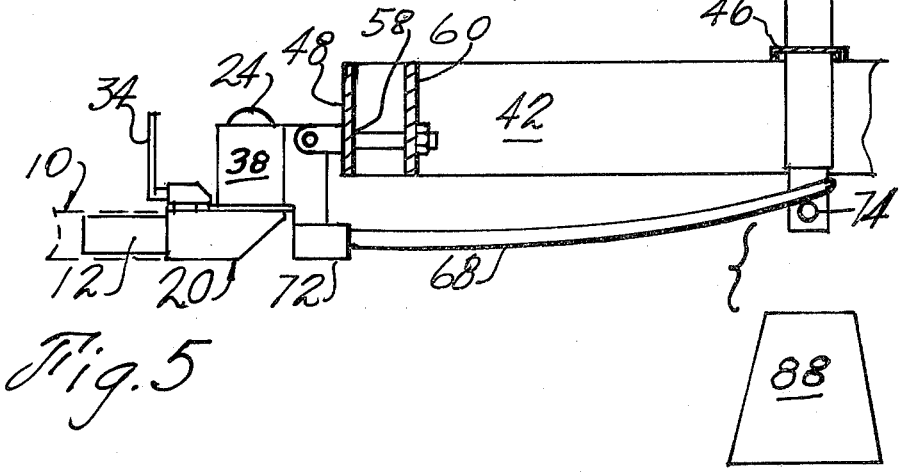

After the open socket of the cylindrical collar 38 is properly aligned above the pin 24 the jack 80 is operated by hand or by power to retract the jack shaft 78 thereby lowering the cylinder 38 into position over pin 24 and resting on the top surface 23 of the bracket 22 at which time the flange 36 snaps into place beneath the latch member 30 so that collar 38 is not accidentally dislodged from a rough road or some other situation. As the jack shaft 78 is further retracted the pins 74, 76 are moved upwardly towards engagement with the respective equalizer members 68, 70 which until engaged are hanging loosely in the condition shown in FIG. 3. As the jack shaft 78 is operated to move the respective pins 74, 76 upwardly against the respective equalizer member 68, 70 as shown in FIG. 4, the equalizer members 68, 70 are bent under stress and tensioned about their respective fixed ends 72, 74 causing the jack shaft 78 to rise off block 88. Thus, it is seen that the jack 78 is double acting in that it raises and lowers the front of the trailer as usual but is also stresses and unstresses the equalizer bars 68, 70 as they rest on the projecting pins 74, 76. FIG. 5 shows jack shaft 78 further retracted with full stressing of equalizer bars 68, 70 and the towing vehicle and trailer assuming a level attitude thereby.

A summary of the aforementioned operation and action is as follows.

1. The jack 80 is operated to elevate the trailer collar 38 above the level of pin 24.

2. The lead vehicle is backed thereby placing the pin 24 in alignment under the collar 38.

3. The jack 80 is operated to lower the collar 38 over the pin 24 until seated and locked.

4. The jack 80 is continued in operation until the equalizer members 68, 70 are properly stressed (maintaining the trailer and lead vehicle substantially level on a level surface).

Therefore, this method and procedure only requires, after alignment of the collar and pin 24, the continuous operation of the jack 80 in one direction to first lower the trailer hitch collar 38 to lock position and then to properly stress the equalizers 68, 70 thus raising the trailer hitch to level position. The operator does not install or remove any equalizers, or similar members.

It should be understood that one of the equalizers 68, 70 may be eliminated and the operation will still be satisfactory and acceptable. This is, in the case of smaller trailers and trailers of less weight it is not absolutely necessary to have separate equalizers 68, 70 on opposite sides of the jack 80 because equalization will take place from the stress and pressure of a single equalizer 68 or 70 against the jack shaft 78 by transmission of forces through the collar 38 to the pin 24 on drawbar coupler 20.

While I have shown and described a particular preferred embodiment of the present invention together with a suggested mode of operation this is for purpose of illustration and does not constitute any sort of limitation on the scope of the invention since various alterations, changes, deviations, eliminations, additions, and departures may be made in the embodiment shown and described without departing from the scope of my invention as defined only by a proper interpretation of the appended claims.

What is claimed:

1. In a detachable hitch between a lead towing vehicle and a towed trailer:

a. a lead vehicle having a substantially vertical hitch pin mounted thereon, b. a trailer having a coupling means thereon engageable with said verticalpin on said lead vehicle, c. ground engaging means, for elevating and lowering said trailer with respect to said hitch pin for the purpose of hitching and unhitching said trailer from said towing vehicle, d. means mounting said coupling means on said trailer for swinging movement about a transverse axis thereacross, e. other means mounting said coupling means on said trailer for rotary movement about a longitudinal axis of said trailer, f. an equalizer means attached to said coupling and engaging said trailer when in towed position on said lead vehicle, g. and equalizer stressing means on said trailer for placing said equalizer means under stress when said trailer is being towed.

2. The device in claim 1 wherein:

said means for elevating is a jack and said jack has a portion engageable with said equalizer means to provide the stress whereby said jack is the equalizer stressing means said jack being operable in one direction to engage the ground and lift the end of said trailer from the ground and operable in another direction to lower said end of the trailer towards the ground for hitching and unhitching purposes and to engage said equalizer member and stress same about its fixed end.

3. The device in claim 1 wherein said equalizer means is a member having one end attached to the coupling and the other end extending therefrom and engageable with said jack.

4. The device claimed in claim 1 wherein said coupling means is a collar, said vertical pin having a support surface therewith on which said collar rests, and means for holding said collar in place.

5. The device claimed in claim 1 wherein said respective means and other means for mounting said coupling means for respective swinging and rotary movements comprises a longitudinal shaft on said trailer end, and a transverse pivot pin through said longitudinal shaft engaged by said collar.

6. The device claimed in claim 1 wherein said lead vehicle has a support surface thereon adjacent said pin, said collar on said trailer having a pair of equalizer members attached thereto said spaced from one another, said equalizer members extending from said collar and being engageable with said jack on opposite sides thereof.

7. The device claimed in claim 1 wherein said respective means and other means for mounting said coupling means for respective swinging and rotary movements comprises a rearward projecting portion thereon, there being a longitudinal pivot shaft mounted on said trailer, a transverse pivot pin connecting said pivot shaft to said collar.

8. The device claimed in claim 1, wherein:

said coupling means is a collar having a transverse pin thereon which is the means for mounting same for swinging movement, said pin being mounted on a longitudinal shaft which is the means for mounting for rotary movement.

9. The device in claim 7 wherein said equalizer means comprising at least one equalizer member having one end attached to said coupling and the other end spaced therefrom.

10. The device in claim 8 wherein said equalizer member stressing means is a jack which is the same means for raising and lowering said trailer whereby when said trailer is lowered into position and said jack is operated to stress said equalizer.

11. In a trailer hitch for detachably connecting a lead vehicle such as an automobile to a trailer such as a boat trailer or house trailer:

a. an adjustable drawbar on said lead vehicle having a support portion thereon to support the front end of the trailer, b. a vertical pin fixed on said support on said drawbar and extending vertically upwardly therefrom, c. a trailer having a trailer frame with a forward end thereon, d. a jack having operative control means thereon and being supported on said trailer behind said forward end for jacking said trailer against a fixed point on the ground, said jack including a vertically movable jack shaft having a lower end thereon, e. a coupler collar having a socket therein positionable on said vertical pin on said lead vehicle by elevating said collar sufficiently to align said pin beneath said socket by elevating said trailer end by means of said jack operating against a fixed point on the ground, and then lowering said socket into position over said pin whereby said front end of said trailer rests on the drawbar, f. means mounting said collar for rotational movement about a longitudinal centerline on said trailer and means also mounting said collar for swinging motion on the front end of said trailer about a substantially transverse pivot point, g. an equalizer member extending fron and attached to said collar and thereby being mounted for motion in all directions the same as said collar, said equalizer enxteding rearwardly beneath said trailer frame and to a position adjacent said jack for selective engagement therewith to be stressed thereby.

* * * * *